United States Patent Office 3,749,706
Patented July 31, 1973

3,749,706
NOVEL DIPEPTIDE AMIDE AND PROCESS FOR ITS MANUFACTURE
Rolf Geiger, Frankfurt am Main, Hans Wissmann, Bad Soden, Taunus, and Wolfgang König, Langenhain, Taunus, Germany, and Genevieve Azadian nee Boulanger, Paris, France, assignors to Farbwerke Hoechst Aktiengesellschaft vormals Meister Lucius & Bruning, Frankfurt am Main, Germany
No Drawing. Filed Apr. 7, 1971, Ser. No. 132,193
Claims priority, application Germany, Apr. 9, 1970, P 20 16 970.4
Int. Cl. C07c 103/52
U.S. Cl. 260—112.5                                                5 Claims

ABSTRACT OF THE DISCLOSURE

A dipeptide amide of the Formula I

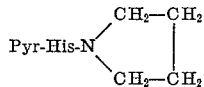

in which Pyr is L-pyroglutamyl and His is L-histidyl is prepared by condensing L-pyroglutamic acid or a glutamic acid derivative of the general formula

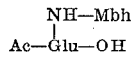

in which Ac stands for the tertiary-butyloxy-carbonyl, benzyloxy-carbonyl, adamantyloxy-carbonyl or isobornyloxycarbonyl radical and Mbh stands for the 4,4'-dimethoxybenzhydryl group, with L-histidine-pyrrolidide or reacting the dipeptide of the general formula

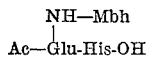

in which Ac and Mbh have the meanings given above, with pyrrolidine with the aid of dicyclohexyl-carbodiimide in the presence of N-hydroxy-succinimide, 1-hydroxy-benzotriazole or 3-hydroxy-4-oxo-3,4-dihydro-1,2,3-benzotriazine, and converting the reaction product into the dipeptide amide of the Formula I by boiling in trifluoroacetic acid. The compound has an effect on the thyrotropine release of the pituitary gland.

---

The present invention relates to a dipeptide amide of the formula

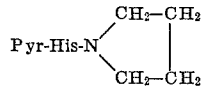                I in which Pyr stands for the L-pyroglutamyl radical and His stands for the L-histidyl radical.

The invention furthermore relates to a process for the manufacture of the compound of the Formula I, which comprises condensing L-pyroglutamic acid or a glutamic acid derivative of the general Formula II

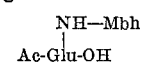                II in which Ac stands for the tertiary-butyloxycarbonyl group, the benzyloxy-carbonyl group, the adamantyloxy-carbonyl group or the isobornyloxy-carbonyl group and Mbh stands for the 4,4'-dimethyloxy-benzhydryl group, according to methods known in peptide chemistry, with L-histidine-pyrrolidide of the Formula III

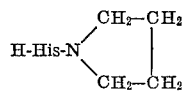                III or reacting a dipeptide of the general Formula IV

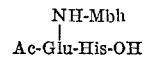                IV in which Ac and Mbh have the above meanings, with the aid of dicyclohexyl-carbodiimide in the presence of N-hydroxysuccinimide, 1-hydroxy-benzotriazole or 3-hydroxy - 4 - oxo-3,4-dihydro-1,2,3-benzotriazine, with pyrrolidine of the Formula V

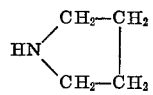                V and converting the reaction product of the general Formula VI

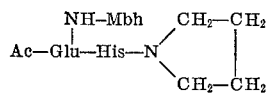                VI into the dipeptide-amide of the Formula I by boiling in trifluoroacetic acid.

Surprisingly, the dipeptide-amide of the invention has a high THR-activity (TRH=thyrotropine-releasing hormone), which is only slightly inferior to that of natural TRH. As the dipeptide derivative, it is, however, substantially easier to obtain than natural TRH, even if this is prepared in a synthetic manner.

The compound of the invention can be prepared according to the methods known in peptide chemistry, among which some proved to be especially advantageous.

The first method starts from the compound of the general Formula III, which is prepared in known manner by condensation of Z-His-OH (N-benzyloxy-carbonyl-L-histidine) or Z-His-N₃ (N-benzyloxy-carbonyl-histidine azide) with pyrrolidine (V) and subsequent hydrogenolytic or protonsolvolytic splitting off of the Z-group. The reaction with L-pyroglutamic acid is carried out in solvents, for example dimethylformamide, tetrahydrofuran or ethyl acetate, with dicyclohexyl-carbodiimide, optionally with the addition of a component forming active esters, for example hydroxysuccinimide, 1-hydroxy-benzotriazole or 3-hydroxy-4-oxo-3,4-dihydro-1,2,3-benzotriazine. At the beginning of the reaction, a temperature of −10° C. to 0° C. is maintained and the reaction is completed at room temperature. It is especially advantageous to react the amide of the Formula III with article esters of L-pyroglutamic acid, such as the 2,4,5-trichlorophenyl ester or N-hydroxy-succinimide ester, in one of the above-mentioned solvents, preferably at room temperature or at slightly elevated temperature. For the purification of the dipeptide-amide of the invention, it is filtered, for example, through a column packed with a basic ion exchanger, for example Amberlite IR–45 or IRA–400, the filtrate is concentrated, the residue is triturated with ether and the crystals are recrystallized from a small amount of ethanol with an addition of acetone, ethyl acetate or ether.

The amide of the Formula III may also be reacted with the glutamic acid derivatives of the general Formula II. Z-Glu (NH-Mbh)-OH is prepared, for example, according to Chem. Ber. 103 (1970), page 2041. When the Z-group is split off from this compound by hydrogenolysis and the reaction product is acylated with tertiary-butyloxy-carbonyl azide, adamantyl-oxycarbonyl chloride or isobornyloxy-carbonyl chloride, further compounds of the general Formula II are obtained. These are reacted in the same manner as L-pyroglutamic acid with the amides of the general Formula III. In this manner, intermediates of the general Formula VI are obtained, which are distinguished by an excellent capacity of crystallization. This property substantially facilitates purification.

For splitting off the protective groups and simultaneously effecting cyclization of the glutaminyl group to yield the pyroglutamyl group, the reaction mixture is boiled for 30 minutes to 1 hour in trifluoro-acetic acid containing about 10% of anisole. The mixture is then vaporized to dryness in vacuo and filtered through a basic ion exchange, for example Amberlite IR–45 or IRA–400. The filtrate is lyophilized.

Another advantageous method starts from the compound of the general Formula IV, which is, for example, obtained by condensation of Ac-Glu(NH-Mbh)-OH with H-His-OMe and hydrolysis of the dipeptide ester. The reaction is carried out with pyrrolidine in dimethylformamide or dimethyl-acetamide as solvent in the presence of dicyclohexyl-carbodiimide as a condensation agent with the addition of compounds forming active esters, for example N-hydroxy-succinimide, 1-hydroxy-benzotriazole or 3-hydroxy-4-oxo-3,4-dihydro-1,2,3-benzotriazine and the compound of the Formula VI is obtained, which is easy to purify and is converted in the above-described manner into the compound of the Formula I of the invention. The condensation reaction is advantageously started at −10° to 0° C. and completed at room temperature.

The dipeptide amide of the invention serves in medicine for the pituitary function control based on the measuring of the incorporation rate of iodine in the formation of thyroxine and for the treatment of hypothyroidism and its sequels, for example myxedema, in human beings and animals.

The dosage of the compound may vary within wide limits. An effect is already observed upon an intravenous administration of 1 to 10 mg. Generally, 10 to 50 mg. are administered intravenously and up to 1000 mg. per os to human beings, whereupon a substantially prolonged effect is obtained.

EXAMPLE 1

(a) Z-His-pyrrolidide 10 ml. of pyrrolidine were added at 0° C. to a solution of 10.5 g. of Z-His-azide in 100 cc. of ethyl acetate. The mixture was allowed to stand for 15–20 hours at +4° C. After addition of further 200 cc. of ethyl acetate, the mixture was washed with 100 cc. of saturated sodium bicarbonate solution. The ethyl acetate phase was dried over magnesium sulfate and vaporized. The residue was taken up in 100 cc. of 90% methanol and filtered through 50 cc. of ion exchanger Amberlite IR–45 (OH-form). The filtrate was washed with 90% methanol, the filtrates were dried in vacuo at a bath temperature of 30° C. and the residue was triturated with ether. Yield: 9.7 g. $R_f$=0.65 (methanol/water—8:2).

(b) H-His-pyrrolidide acetate 6.9 g. of Z-His-pyrrolidide were catalytically hydrogenated in 100 cc. of 90% acetic acid with the addition of palladium. After evaporation of the solution, an oil remained which was triturated with absolute ether. Yield: 5.1 g. A sample of the oil yielded together with ether/HCl the dihydrochloride (melting point 242° C.).

(c) Pyr-His-pyrrolidide 2.0 g. of the compound obtained sub(b) were suspended in 30 cc. of dimethylformamide. The solution of 3.1 g. of Pyr-2,4,5-trichloro-phenyl ester in 25 cc. of dimethylformamide was added and the mixture was stirred for 20 hours at 0° C. or overnight at room temperature. After distillation of the solvent, the residue crystallized upon trituration with ether. Yield: 4.3 g. Recrystallization from ethanol/acetone. $[\alpha]_D^{20}$: −22° (c.=0.5 in methanol/ethanol—1:1).

EXAMPLE 2

(a) Z-Gln(Mbh)-His-OMe 16.5 g. of Z-Gln(Mbh)-OH, 7.85 g. of

H-His-Ome.2HCl, 8.8 g. of 1-hydroxy-benzothiazole and 9.0 ml. of triethylamine were dissolved in 220 cc. of chloroform. At 0° C., a solution of 7.2 g. of dicyclohexyl-carbodiimide in 12 cc. of chloroform was added and the whole was stirred for 3 hours at room temperature. Disregarding the precipitate, the chloroform was separated by distillation and the residue was taken up in 60 cc. of warm dimethylformamide. Undissolved dicyclohexyl-urea was separated by filtration and the solution was poured into 400 cc. of water. The gelatinous precipitate was suction-filtered, washed with water and ether and dried in the air. Yield: 21.3 g.

(b) Z-Gln(Mbh)-His-OH 20.5 g. of Z-Gln(Mbh)-His-OMe were dissolved in a mixture of 40 cc. of methanol, 65 cc. of water and 160 cc. of dioxan and the mixture was hydrolyzed at pH 12.7 with dropwise addition of 1 N NaOH and control of pH in an autotitrator. Consumption: 45.2 cc. of 1 N NaOH. 45.2 cc. of 1 N HCl were then added, the whole was concentrated in vacuo to a small volume and a large amount of water was added. The precipitate was suction-filtered and dried. Yield: 14.4 g. The product was purified by boiling it twice with ethanol. Yield: 11.5 g.

(c) Z-Gln(Mbh)-His-pyrrolidide 0.50 ml. of pyrrolidine was added to a suspension of 3.2 g. of Z-Gln(Mbh)-His-OH and 1.35 g. 1-hydroxy-benzotriazole in 30 ml. of dimethylformamide and at 0° C. a cooled solution of 1.1 g. of DCC in dimethylformamide was added thereto. The whole was stirred for 1 hour at 0° C. and for another hour at room temperature, the precipitate was suction-filtered and the filtrate was concentrated. The residue was triturated with 2 N sodium carbonate solution, suction-filtered and washed with water. The substance was recrystallized from ethyl acetate. Yield: 2.7 g. (79%).

(d) Pyr-His-pyrrolidide 1 g. of Z-Gln(Mbh)-His-pyrrolidide was refluxed for 1.5 to 2 hours with 0.5 ml. of anisole in 5 ml. of trifluoroacetic acid. The trifluoroacetic acid was distilled off in vacuo and the residue was distributed between ether and water. The ether phase was once more shaken with water. The combined aqueous phases were clarified with charcoal and filtered through a strongly basic exchanger (for example, Serdolit Blue). The eluate was freeze-dried. Yield: 313 mg. (67%). Recrystallization from ethanol/acetone.

What is claimed is:

1. A dipeptide amide of the formula

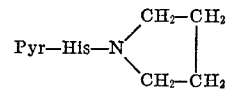

wherein Pyr is L-pyroglutamyl and His is L-histydyl.

2. The method of making the compound of claim 1 which comprises condensing L-pyroglutamic acid or a glutamic acid derivative of the formula

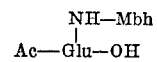

wherein Ac is t-butyloxycarbonyl, benzyloxycarbonyl, adamantyloxycarbonyl, or isobornyloxycarbonyl and Mbh is 4,4-dimethoxybenzhydryl, with L-histidine pyrrolidide of the formula

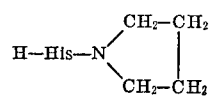

by the active ester method to form

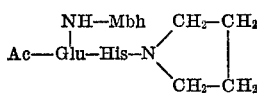

and then boiling this product in trifluoroacetic acid to form the desired final product.

3. The method of making the compound of claim 1 which comprises reacting a dipeptide of the formula

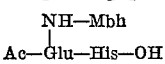

wherein Ac is t-butyloxycarbonyl, benzyloxycarbonyl, adamantyloxycarbonyl, or isobornyloxycarbonyl and Mbh is 4,4-dimethoxybenzhydryl, with pyrrolidine of the formula

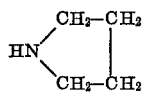

in the presence of dicyclohexyl-carbodiimide and N-hydroxy succinimide, 1-hydroxy-benzotriazole, or 3-hydroxy-4-oxo-3,4-dihydro-1,2,3-benzotriazine to form

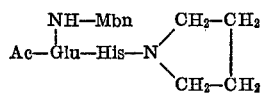

and then boiling this product in trifluoroacetic acid to form the desired final product.

4. A process for the manufacture of pharmaceutical compositions having an effect on the thyreotropine release of the pituitary gland, which comprises bringing the dipeptide amide of the Formula I

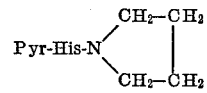

into a dosage unit form suitable for therapeutical or diagnostic purposes.

5. Pharmaceutical compositions having an effect on the thyreotropine release of the pituitary gland, which comprise an effective amount of the dipetide amide of the Formula I in a dosage of from 1 to 1000 mg. per unit.

References Cited

Journal of Medicinal Chemistry (1971), vol. 14, No. 6, page 487 relied on, by Chang et al.

ELBERT L. ROBERTS, Primary Examiner

U.S. Cl. X.R.

424—177